United States Patent
Koakutsu

(10) Patent No.: US 7,551,297 B2
(45) Date of Patent: Jun. 23, 2009

(54) CONTROLLING ACCESS TO A PORTABLE MEDIUM INSERTED IN AN IMAGE PROCESSING APPARATUS

(75) Inventor: Toshinobu Koakutsu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 642 days.

(21) Appl. No.: 11/266,231

(22) Filed: Nov. 4, 2005

(65) Prior Publication Data

US 2006/0092434 A1 May 4, 2006

(30) Foreign Application Priority Data

Nov. 4, 2004 (JP) .............................. 2004-320098

(51) Int. Cl.
G06F 3/12 (2006.01)
G06F 15/00 (2006.01)
G06K 1/00 (2006.01)

(52) U.S. Cl. ........................................ 358/1.1; 348/373
(58) Field of Classification Search ................. 358/373, 358/1.1; 348/374, 231
See application file for complete search history.

(56) References Cited

U.S. PATENT DOCUMENTS

| 4,897,735 | A | 1/1990 | Oneda |
| 6,491,226 | B1 | 12/2002 | Nishioka |
| 6,498,658 | B1 | 12/2002 | Sekikawa |
| 7,057,661 | B2 * | 6/2006 | Misawa .................... 348/373 |
| 2001/0017664 | A1 | 8/2001 | Misawa |
| 2002/0033959 | A1 | 3/2002 | Ando et al. |
| 2004/0130732 | A1 | 7/2004 | Denpo |
| 2005/0012953 | A1 | 1/2005 | Fujishige et al. |
| 2005/0089302 | A1 * | 4/2005 | Fukushima et al. ........... 386/46 |
| 2008/0068787 | A1 * | 3/2008 | Okada .................... 361/684 |

FOREIGN PATENT DOCUMENTS

| EP | 00-563-884 A2 | 10/1993 |
| EP | 00-854-630 A2 | 7/1998 |
| JP | 04-137594 | 5/1992 |
| JP | 2002-300334 | 10/2002 |

OTHER PUBLICATIONS

U.S. Appl. No. 11/195,773, filed Aug. 3, 2005, Watanabe et al.
Patent Abstracts of Japan, JP 04-205691, Jul. 27, 1992.
Patent Abstracts of Japan, JP 05-233475, Sep. 10, 1993.

* cited by examiner

*Primary Examiner*—Twyler L Haskins
*Assistant Examiner*—David L Suazo
(74) *Attorney, Agent, or Firm*—Oblon, Spivak, McClelland, Maier & Neustadt, P.C.

(57) ABSTRACT

An apparatus, method, system, computer program and product, capable of controlling access to a portable medium inserted in a medium interface of an image processing apparatus. To control access, a medium cover is configured to be closed to cover the medium interface and to be opened to expose the medium interface. A detector is configured to detect opening or closing of the medium cover to generate a detection result. Operation of the image processing apparatus, which requires access to the portable medium, is controlled based on the detection result.

19 Claims, 16 Drawing Sheets

US 7,551,297 B2

CONTROLLING ACCESS TO A PORTABLE MEDIUM INSERTED IN AN IMAGE PROCESSING APPARATUS

BACKGROUND OF THE INVENTION

1. Field of the Invention

The following disclosure relates generally to an apparatus, method, system, and computer program and product, each capable of controlling access to a portable medium inserted in an image processing apparatus.

2. Background of the Invention

Recently, a portable medium is widely used, which can store various data. As an example, a user may generate data using a personal computer at home, store the data in a portable medium, and bring the portable medium to another location, such as to a public place. Using a publicly-owned image processing apparatus, the user may perform further image processing, such as editing, printing, or faxing, on the data stored in the portable medium.

To perform such processing by the publicly-owned apparatus, the user inserts the portable medium into a medium interface of the publicly-owned apparatus. Once the portable medium is inserted, the publicly-owned apparatus starts an operation of reading the data from the portable medium.

Under the above-described situation, the user may accidentally eject the portable medium during the reading operation, due to the unfamiliar environment provided by the publicly-owned apparatus. If the portable medium is ejected while being accessed by the apparatus, the data stored in the portable medium or the portable medium itself may be damaged. Further, the reading operation may not be performed successfully.

SUMMARY OF THE INVENTION

An exemplary embodiment of the present invention includes an apparatus, method, system, computer program and product, each capable of controlling access to a portable medium inserted in an image processing apparatus.

To control access to the portable medium, the image processing apparatus includes a medium interface to which the portable medium is inserted; a medium cover configured to be closed to cover the medium interface and to be opened to expose the medium interface; and a detector configured to detect opening or closing of the medium cover to generate a detection result. According to the detection result, operation of the image processing apparatus, which requires access to the portable medium, can be controlled.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
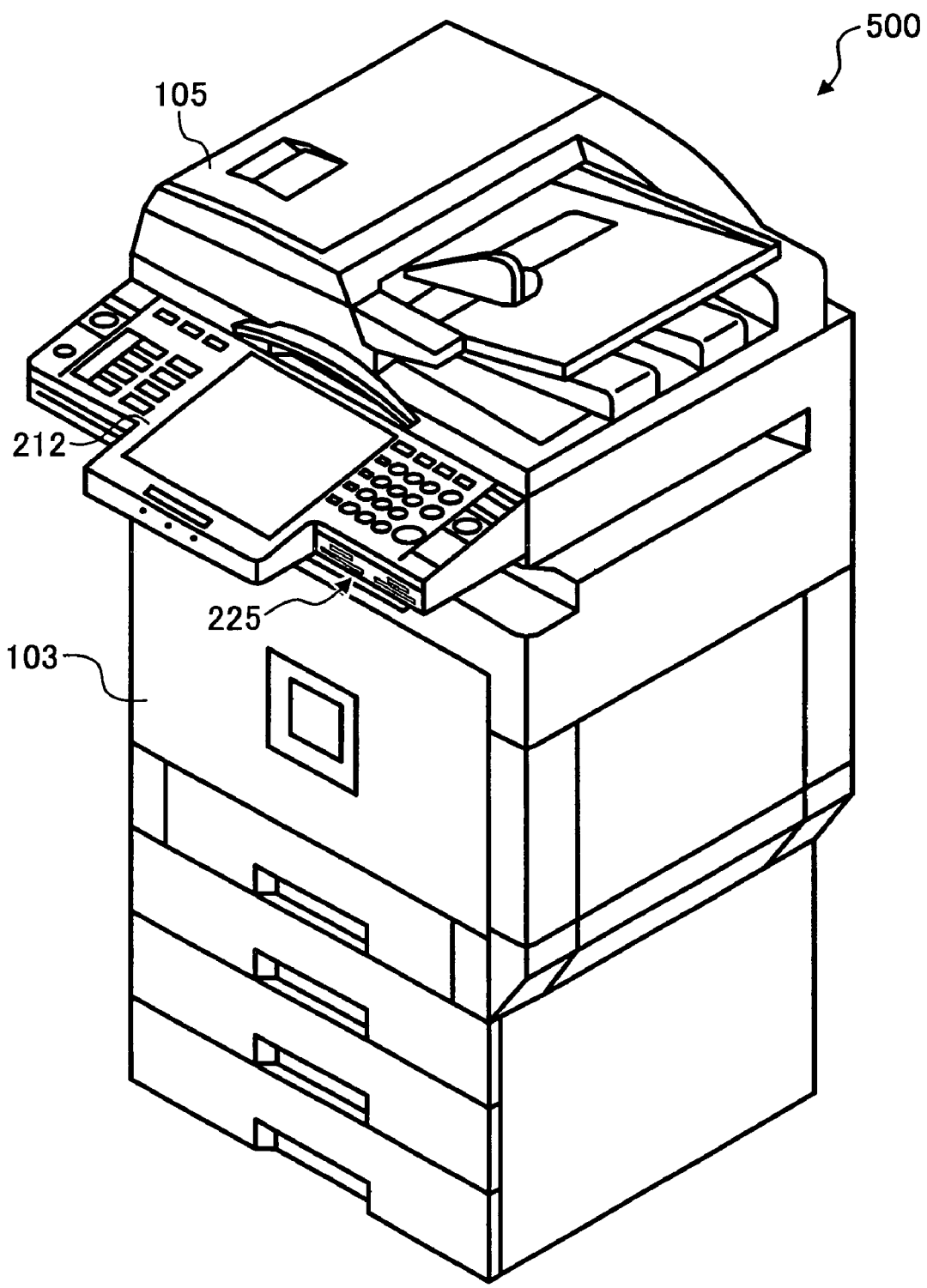
FIG. 1 is a perspective view illustrating the outer appearance of a multifunctional apparatus (MFP) according to an exemplary embodiment of the present invention.

In describing the preferred embodiments illustrated in the drawings, specific terminology is employed for clarity. However, the disclosure of this patent specification is not intended to be limited to the specific terminology selected and it is to be understood that each specific element includes all technical equivalents that operate in a similar manner. Referring now to the drawings, wherein like reference numerals designate identical or corresponding parts throughout the several views, FIG. 1 illustrates an MFP 500 according to an exemplary embodiment of the present invention.

The MFP 500 may look like a copier having a reader 105 at the top surface, a printer 103 in its inside, and an operation panel 212. The operation panel 212 includes a medium interface 225, which includes one or more inlets each corresponding to a specific type of a portable medium. With this configuration, the MFP 500 reads data from at least one portable medium inserted in the medium interface 225, and performs various processing on the data including printing, faxing, copying, editing, etc.

Figure 2:
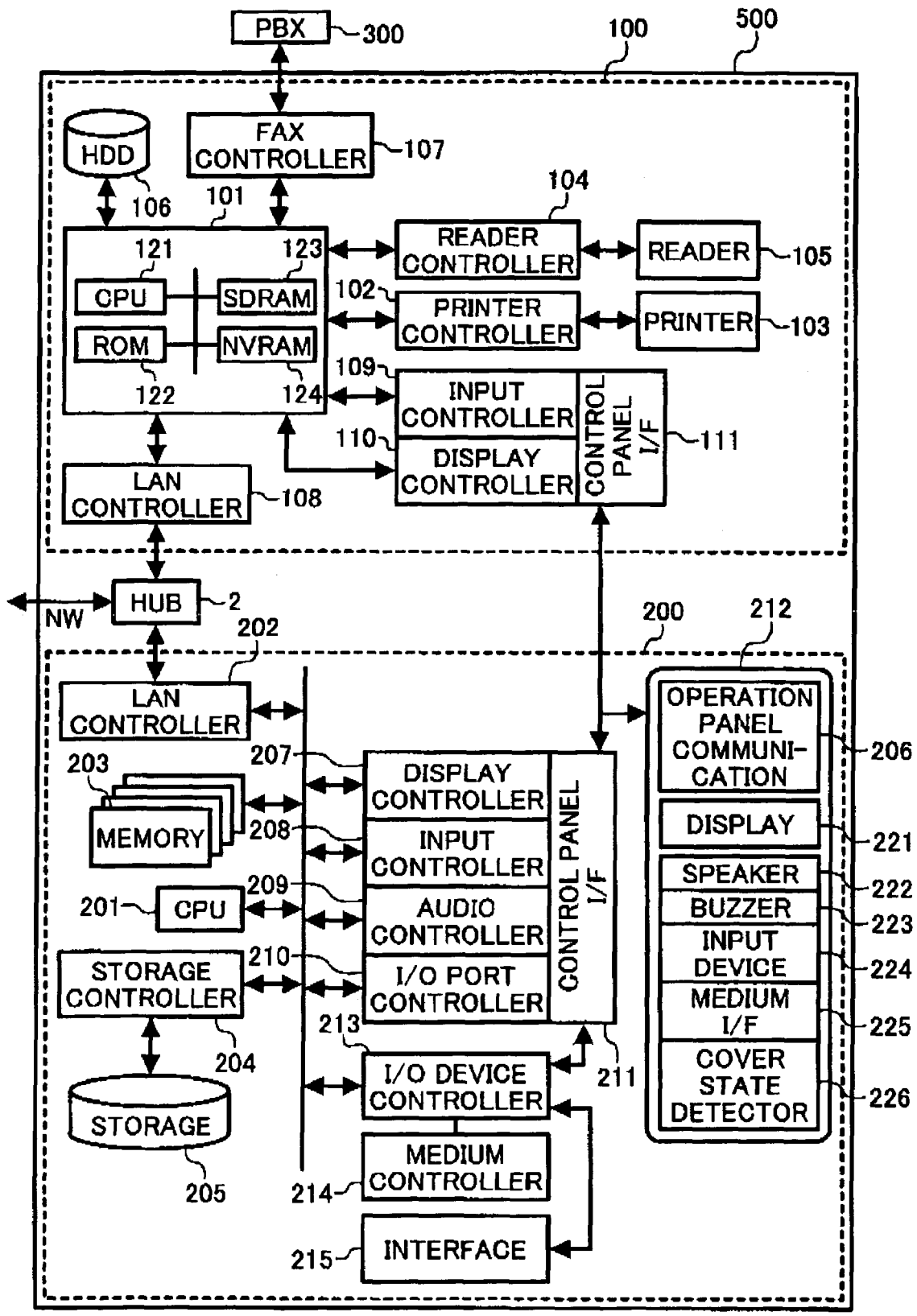
FIG. 2 is a schematic block diagram illustrating the structure of the MFP shown in FIG. 2.

Referring to FIG. 2, the MFP 500 mainly includes an image processing unit 100 and an operation control unit 200, which are connected to each other via a hub 2. However, the image processing unit 100 and the operation control unit 200 may be connected via any other communication device, such as a switch or a switching hub, for example.

The hub 2 is further connected to a network NW, such as a local area network (LAN) or the Internet, for example, to create an image processing system with other apparatuses on the network NW. If the hub 2 is connected to the Internet via a LAN, the hub 2 may be provided with a communication controller, such as a router, exchanging device, cable modem, DSL modem, etc.

The image processing unit 100 includes an image processing controller 101, a printer controller 102, the printer 103, a reader controller 104, the reader 105, a hard disk drive (HDD)

106, a fax controller 107, a LAN controller 108, an input controller 109, a display controller 110, and a control panel interface (I/F) 111.

The operation control unit 200 includes a central processing unit (CPU) 201, a LAN controller 202, a memory 203, a storage controller 204, a storage 205, a display controller 207, an input controller 208, an audio controller 209, an input/output (I/O) port controller 210, a control panel I/F 211, the operation panel 212, an I/O device controller 213, a medium controller 214, and an interface 215. In this example, the operation panel 212 includes an operation panel communicator 206, a display 221, a speaker 222, a buzzer 223, an input device 224, a medium I/F 225, and a cover state detector 226. However, the structure of the operation panel 212 is not limited to the structure shown in FIG. 2, as long as it includes a device capable of notifying a user of an instruction received from the CPU 201, such as a display, audio device including a buzzer or speaker, etc.

Referring to the image processing unit 100, the image processing controller 101 includes any kind of device capable of controlling image processing performed by the image processing unit 100, such as a microcomputer. The image processing controller 101 includes a CPU 121, a read only memory (ROM) 122, a synchronous dynamic random access memory (SDRAM) 123, and a nonvolatile random access memory (NVRAM) 124, which are connected via a bus. The CPU 121 operates as a main processor. The ROM 122 stores various programs such as a control program or system data to be used by the CPU 121 for controlling operation of the image processing unit 100. The SDRAM 123 functions as a work memory area for the CPU 121. The NVRAM 124 stores various data, such as job history data or preference data, for example.

The HDD 106, which is connected to the image processing controller 101, includes any kind of storage device capable of storing a large amount of data, including image data read by the reader 105, image data received by the LAN controller 108 or the fax controller 107, or image data processed by the image processing controller 101.

In an example operation, the CPU 121 loads a particular program from the ROM 122, and applies image processing to image data according to the loaded program. The program may be previously stored in the HDD 106 or it may be downloaded from the network NW. Alternatively, the program may be installed from a storage medium such as an optical disc.

The printer 103 includes any kind of device capable of forming an image on a recording medium. For example, the printer 103 may form a toner image, using a predetermined image forming method including electrophotography, inkjet, dye sublimation transfer, silver salt photography, thermal recording, thermal transfer, etc.

The printer controller 102 includes any kind of device capable of controlling operation of the printer 103, according to an instruction received from the image processing controller 101. For example, upon receiving an instruction for printing image data processed by the image processing controller 101, the printer controller 102 causes the printer 103 to print out the processed image data.

The reader 105 includes any kind of device capable of reading an original image into image data. For example, the reader 105 may be implemented by a scanner, which irradiates light onto the original image, and converts the reflected light to an electric signal using a photoelectric conversion element.

The reader controller 104 includes any kind of device capable of controlling operation of the reader 105, according to an instruction received from the image processing controller 101. For example, upon receiving an instruction for reading from the image processing controller 101, the reader controller 104 causes the reader 105 to read an original image into image data, i.e., an electric signal. The reader controller 104 then converts the electric signal from analog to digital, and outputs the converted signal to the image processing controller 101.

The fax controller 107, which is connected to the image processing controller 101, allows the image processing unit 100 to communicate with other apparatuses via a public switch box (PBX) 300 and a public switched telephone network (PSTN). For example, the fax controller 107 can send or receive fax data to or from other apparatuses on the PSTN.

The LAN controller 108, which is connected to the image processing controller 101, is further connected to the operation control unit 200 and to the network NW via the hub 2. Under control of the CPU 121, the LAN controller 108 may send or receive image data to or from the operation control unit 200 or other apparatuses on the network NW.

The input controller 109 controls exchange of a control signal between the image processing controller 101 and the operation control unit 200 via the control panel I/F 111.

The display controller 110 controls output of a display control signal from the image processing controller 101 to the operation control unit 200 via the control panel I/F 111.

Referring to the operation control unit 200, the LAN controller 202 is connected to the hub 2, and further to the LAN controller 108 of the image processing unit 100 and to the network NW. Under control of the CPU 201, the LAN controller 202 may send or receive image data to or from the image processing unit 100 or other apparatuses on the network NW.

The CPU 201 includes any kind of processor capable of controlling operation of the operation control unit 200. The memory 203 includes any kind of memory device, such as a RAM functioning as a work memory for the CPU 201, and a ROM storing various data.

The storage 205 stores various system data, including an operating system (OS) or various application programs, for example. The storage 205 may additionally store various data used for image processing, such as printing forms, for example. The storage controller 204 controls data input or data output of the storage 205.

In an example operation, the CPU 201 loads a particular program from the storage 205. Using the memory 203 as a working area, the CPU 201 controls operation of the operation control unit 200 according to the loaded program.

The display controller 207 controls operation of the display 221 through the control panel I/F 211. The input controller 208 detects whether any instruction from a user is input using the input device 224, through the control panel I/F 211. The audio controller 209 controls operation of the speaker 222 or operation of the buzzer 223, under control of the CPU 201 through the control panel I/F 211. The I/O port controller 210 controls input or output of data to or from the operation panel 212, under control of the CPU 201 through the control panel I/F 211.

The I/O device controller 213 includes any kind of device capable of controlling operation of an input or output device connected through the interface 215, such as an ear phone, a digital camera, etc. The interface 215 includes any kind of interface, such as USB, IEEE1394, or SCSI. The medium controller 214 includes any kind of device capable of controlling operation of a storage medium drive, such as an optical disc drive, for example.

The operation panel communicator 206 controls input or output of data to or from the operation panel 212. The display 221 includes any kind of device capable of displaying data to a user, such as a liquid crystal display (LCD). The speaker 222 includes any kind of device capable of outputting a sound such as a voice message. The buzzer 223 includes any kind of device capable of outputting a sound such as a beep sound.

The input device 224 allows a user to input an instruction. It may be provided with a plurality of keys or buttons, such as a ten key, a functional key, a keyboard, a touch panel, etc.

The medium I/F 225 is where a portable medium is inserted. In this example, the medium I/F 225 is covered with a medium cover at least when the portable medium is inserted.

The cover state detector 226 detects the state of the medium cover and sends the detection result to the I/O port controller 210 through the control panel I/F 211. Based on the detection result, the CPU 201 controls operation of the operation control unit 200.

In this example, the portable medium includes any kind of portable medium capable of storing data using various means including light, magnetism, or electricity. Examples of portable medium include, but are not limited to, optical discs such as CD-ROM, CD-R, CD-RW, DVD-ROM, DVD-RAM, DVD-R, DVD+R, DVD-RW, and DVD+RW, magneto optical (MO) discs, mini discs (MD), compact flash memory, memory sticks, smart media, memory cards, Zip, a floppy disk, digital audio tape (DAT), a digital compact cassette (DCC), magnetic cards, multimedia cards, secure digital cards, and IC cards.

Figure 3:
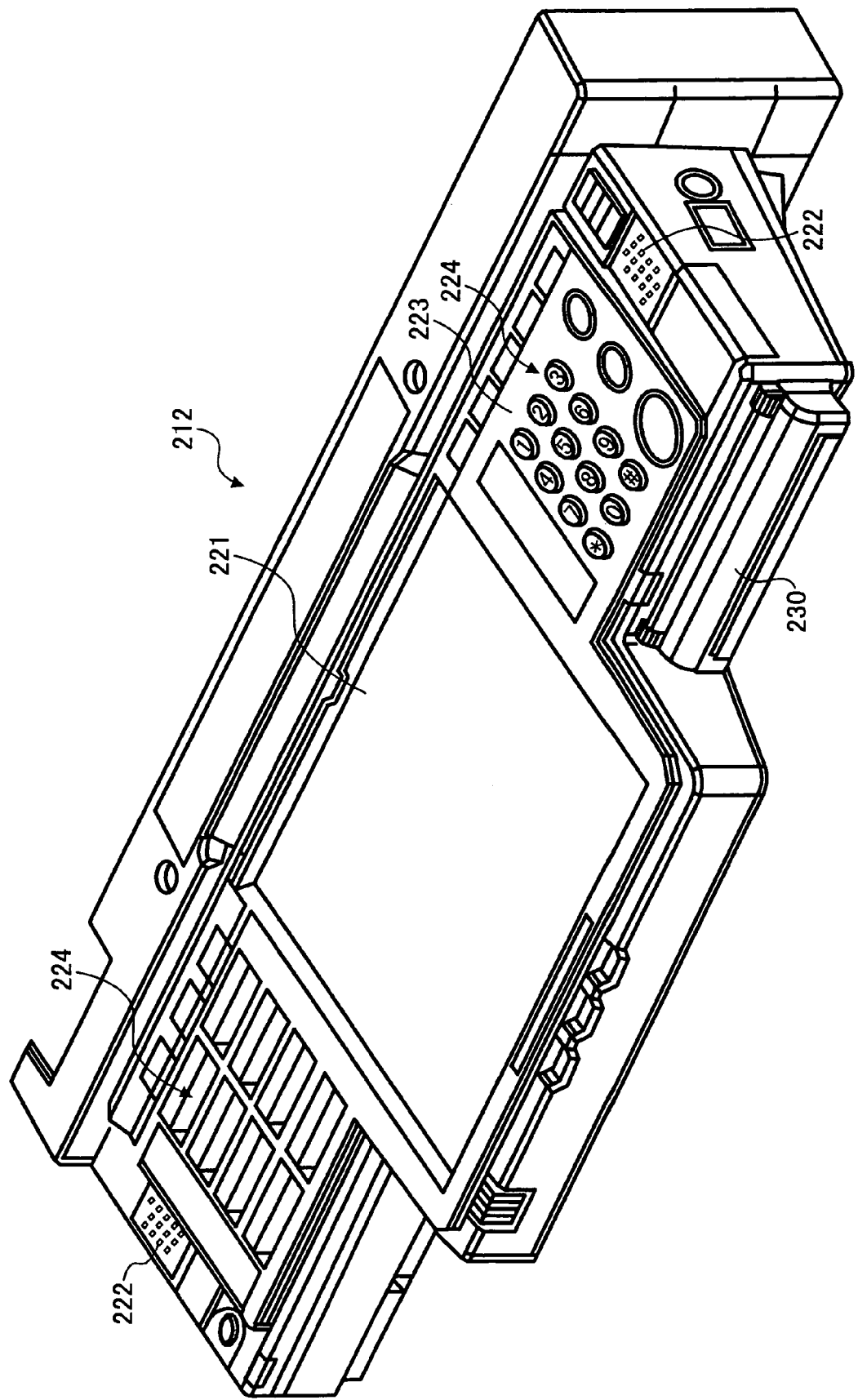
FIG. 3 is a perspective view illustrating the outer appearance of an operation panel shown in FIG. 2.
Figure 4:
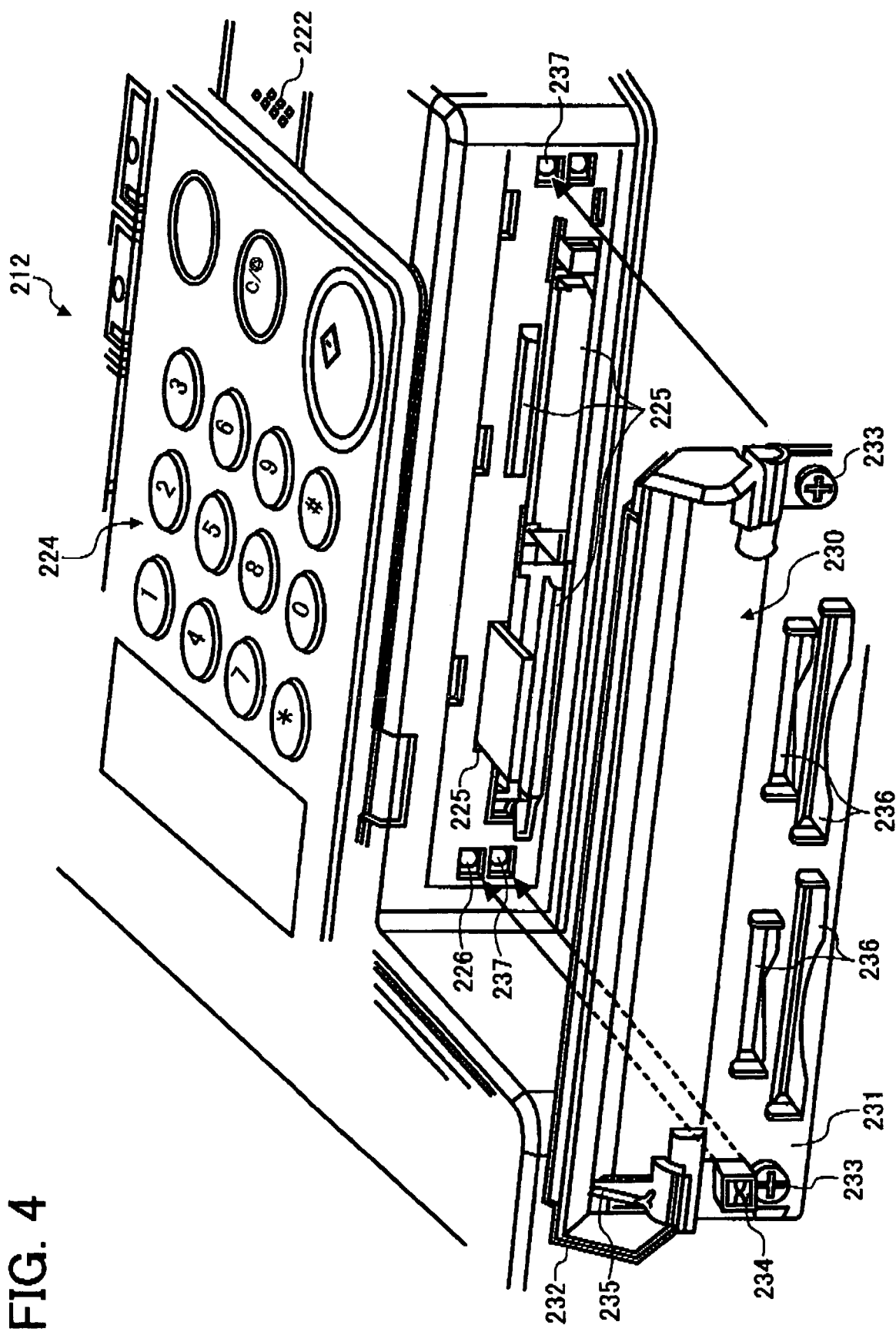
FIG. 4 is an enlarged perspective view illustrating a portion of the operation panel shown in FIG. 3.

Referring now to FIGS. 3 and 4, the structure of the operation panel 212 is explained according to an exemplary embodiment of the present invention.

As shown in FIG. 3, the display 221 is provided at a central portion of the operation panel 221. At right and left sides of the display 221, a plurality of keys is provided, which functions as the input device 224. Two speakers, i.e., the speakers 222, are provided at the side edges of the operation panel 212. The buzzer 223 is provided inside the operation panel 221. The medium cover 230 is provided at the front side surface of the operation panel 212 to cover the medium I/F 225 (FIG. 4).

In this example, as shown in FIG. 4, the medium I/F 225 includes four inlets, each corresponding to a specific type of portable medium. However, the number or shapes of the inlets are not limited to this example.

The medium cover 230 includes a panel section 231 and a cover section 232. Four openings 236 are formed on the panel section 231, each corresponding to the inlets of the medium I/F 225. The panel section 231 is fixed to the front side surface of the operation panel 212 to cover the medium interface 225. For example, as illustrated in FIG. 4, a pair of screws 233 of the panel section 231 may be screwed into a pair of screw receivers 237 to tightly fix the panel section 231 onto the front side surface of the operation panel 212.

The cover section 232 is attached to the panel section 231 such that it can move in the direction toward the panel section 231 or in the direction away from the panel section 231. The cover section 232 may be formed in various shapes as long as it can cover the openings 236 of the panel section 231.

As illustrated in FIG. 4, the cover state detector 226 is provided on the front side surface of the operation panel 212, at the position right above one of the screw receivers 237. In this example, the cover state detector 226 may be implemented by a switch, which is turned on when it is pressed. Further, a pin 234 is provided on the panel section 231 at the position corresponding to the position of the cover state detector 226. A protruding element 235 is provided on the cover section 232 at the position corresponding to the position of the pin 234. With this structure, the cover state detector 226 can detect opening or closing of the medium cover 230.

For example, when the medium cover 230 is closed, i.e., when the cover section 232 is in close contact with the panel section 231, the pin 234 is pushed by the protruding element 235 toward the cover state detector 226. As a result, the cover state detector 226 is turned on to send an on signal to the I/O port controller 210 of FIG. 2. Based on the on signal, the CPU 201 can determine that the medium cover 230 is closed.

When the medium cover 230 is open, i.e., when the cover section 232 is moved away from the panel section 231 as illustrated in FIG. 4, the protruding element 235 is moved away from the pin 234, causing the pin 234 to move away from the cover state detector 226. As a result, the cover state detector 226 is turned off to send an off signal to the I/O port controller 210 of FIG. 2. Based on the off signal, the CPU 201 can determine that the medium cover 230 is open. In this example, the pin 234 is provided with an elastic member, such as a spring, which helps the pin 234 to return to the position away from the cover state detector 226.

Figure 5:
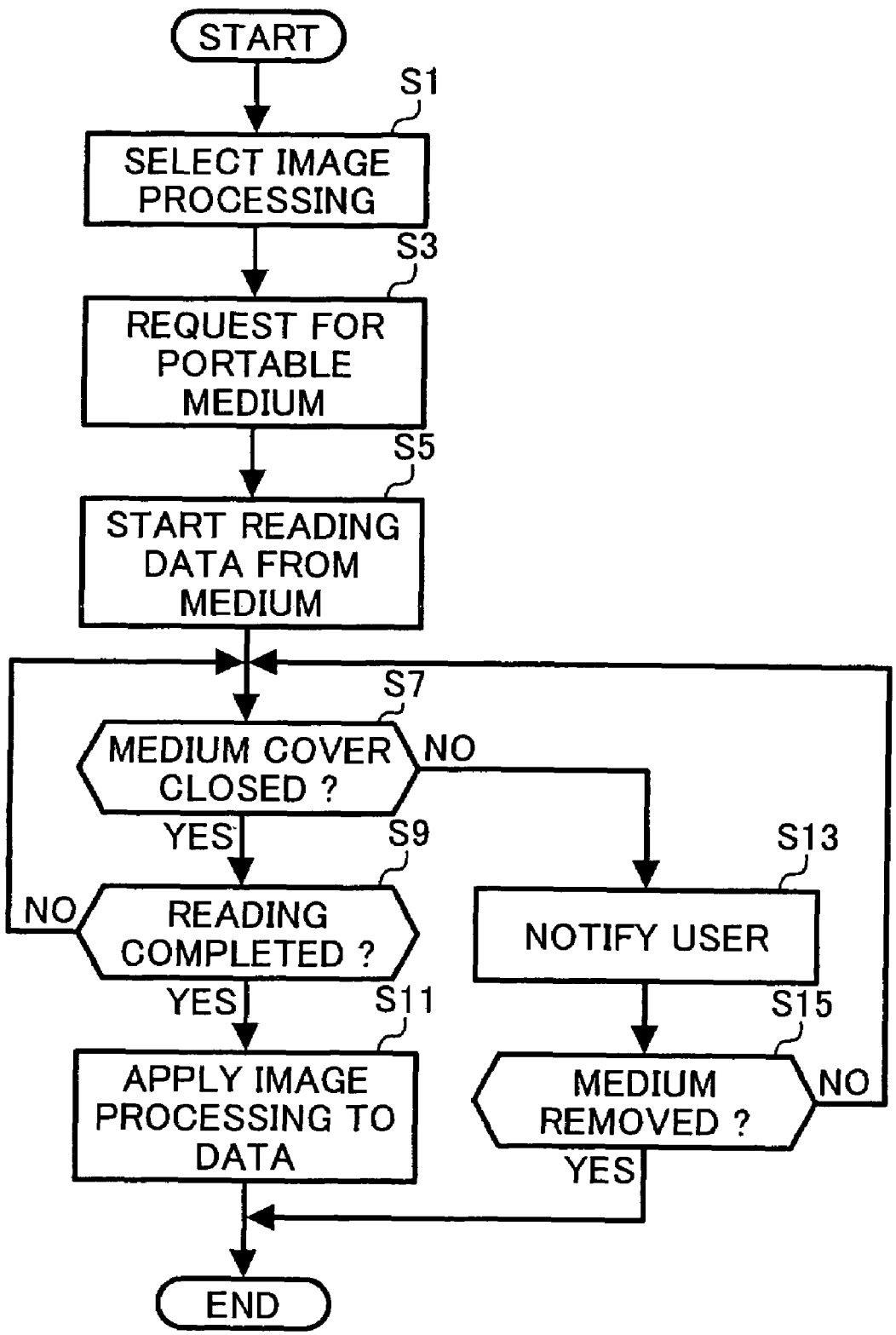
FIG. 5 is a flowchart illustrating control of a reading operation of the MFP shown in FIG. 1, according to an exemplary embodiment of the present invention.

Referring to FIG. 5, control of a reading operation of the MFP 500 according to opening or closing of the medium cover 230 is explained according to an exemplary embodiment of the present invention. The steps illustrated in FIG. 5 are performed by the CPU 201 according to an instruction received from a user through the input device 224.

Step S1 selects image processing to be performed by the MFP 500. For example, the MFP 500 may display a screen on the display 221, which requests the user to select image processing to be performed by the MFP 500, such as printing or faxing, for example. In this step, the user is assumed to have selected image processing, which requires a reading operation for reading data from a portable medium.

Step S3 requests the user to insert the portable medium into the medium I/F 225. For example, the CPU 201 may display a screen on the display 221, asking the user to insert the portable medium. Alternatively, the CPU 201 may cause the buzzer 223 to output a beep sound asking the user to insert the portable medium. Alternatively, the CPU 201 may cause the speaker to output a voice message asking the user to insert the portable medium.

Once the portable medium is inserted into the medium I/F 255, Step S5 starts an operation of reading data from the portable medium.

While the reading operation is being performed, Step S7 determines whether the medium cover 230 is closed using the cover state detector 226. If the medium cover 230 is closed ("YES" in Step S7), the operation proceeds to Step S9. If the medium cover 230 is open ("NO" in Step S7), the operation proceeds to Step S13.

Step S13 notifies the user that the medium cover 230 is open. In this step, the CPU 201 may request the user to close the medium cover 230. For example, the CPU 201 may display a request screen on the display 221. Alternatively, the CPU 201 may cause the buzzer 223 to output a beep sound. Alternatively, the CPU 201 may cause the speaker to output a voice message.

Step S15 determines whether the portable medium is removed out from the medium I/F 225. If the portable medium is removed ("YES" in Step S15), the operation ends without completing the reading operation started in Step S5. If the portable medium is not removed ("NO" in Step S15), the operation returns to Step S7.

Step S9 determines whether the reading operation started in Step S5 has been completed. If the reading operation has been completed ("YES" in Step S9), the operation proceeds to Step S11. Otherwise ("NO" in Step S9), the operation returns to Step S7.

Step S11 applies image processing selected in Step S1 to the data read out from the portable medium, and the operation ends.

The operation of FIG. 5 may be performed in various ways. In one example, Step S7 may determine whether the medium cover 230 has been kept closed. If the medium cover 230 was opened even once during the reading operation started in Step S5 ("NO" in Step S7), the operation proceeds to Step S113. For example, a detection flag is initially set to 0, indicating that the medium cover 230 is closed. When the medium cover 230 is opened, the detection flag is changed to 1, indicating that the medium cover 230 is opened. Based on the value of the detection flag, the CPU 201 can determine whether the medium cover 230 has been kept closed during the reading operation.

In another example, in Step S15, if the portable medium has not been removed ("NO" in Step S15), the operation may return to Step S5 to restart the reading operation.

In another example, in Step S15, if the portable medium has been removed ("YES" in Step S15), the operation may return to Step S1 to restart the operation from Step S1.

In another example, if the reading operation has been completed ("YES" in Step S9), the CPU 201 may further request the user to remove the portable medium from the medium I/F 255. For example, the CPU 201 may display a screen on the display 221. Alternatively, the CPU 201 may cause the buzzer 223 to output a beep sound. Alternatively, the CPU 201 may cause the speaker to output a voice message.

Figure 6:
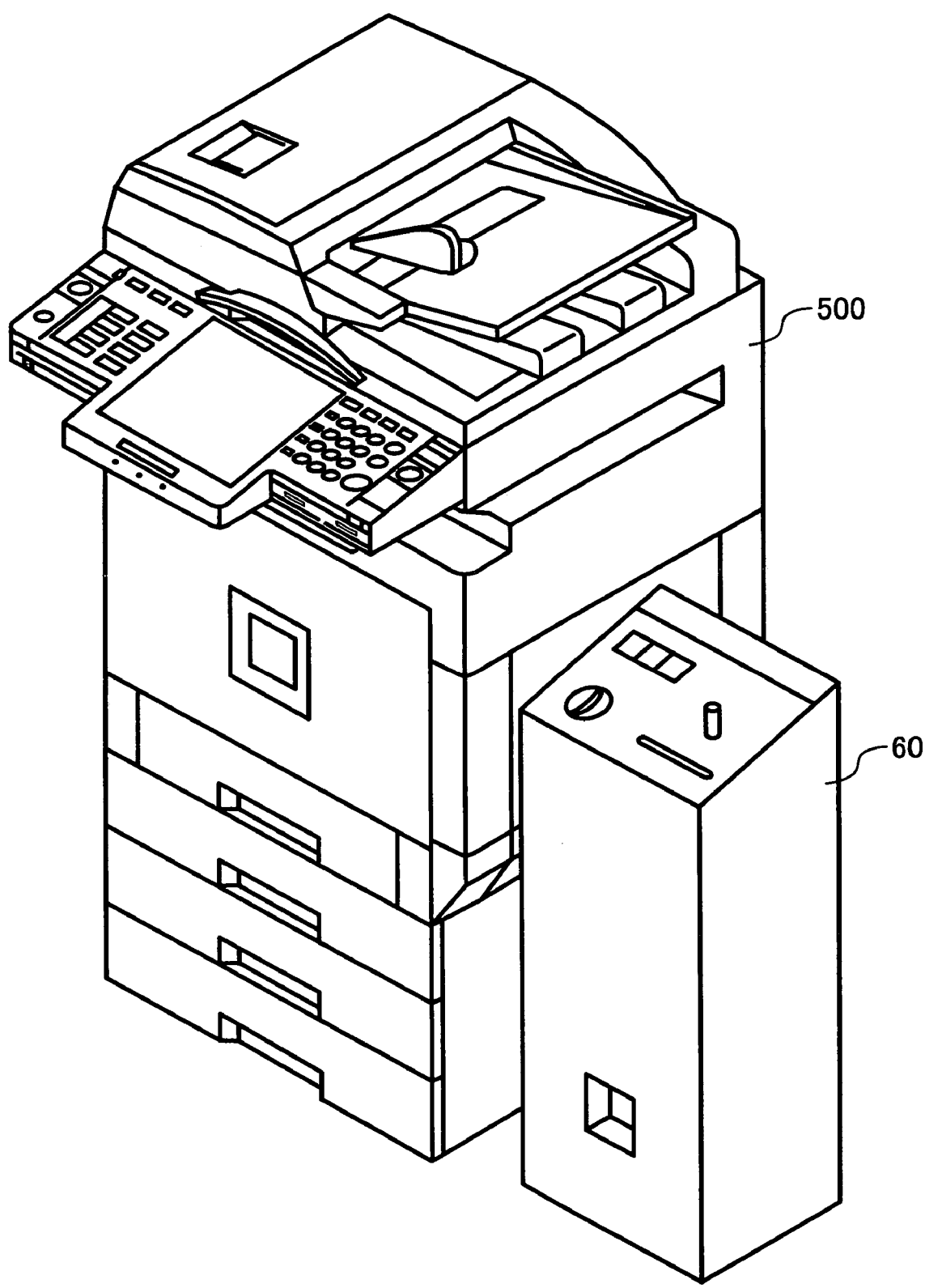
FIG. 6 is a perspective view illustrating the outer appearance of the MFP of FIG. 1 connected to a charging device, according to an exemplary embodiment of the present invention.

As described above referring to FIG. 2, the MFP 500 of FIG. 1 may be connected to other devices via the network NW or via the interface 215. For example, the MFP 500 of FIG. 1 may be further connected to a charging device, such as a coin vendor 60 shown in FIG. 6, via the interface 215.

Figure 7:
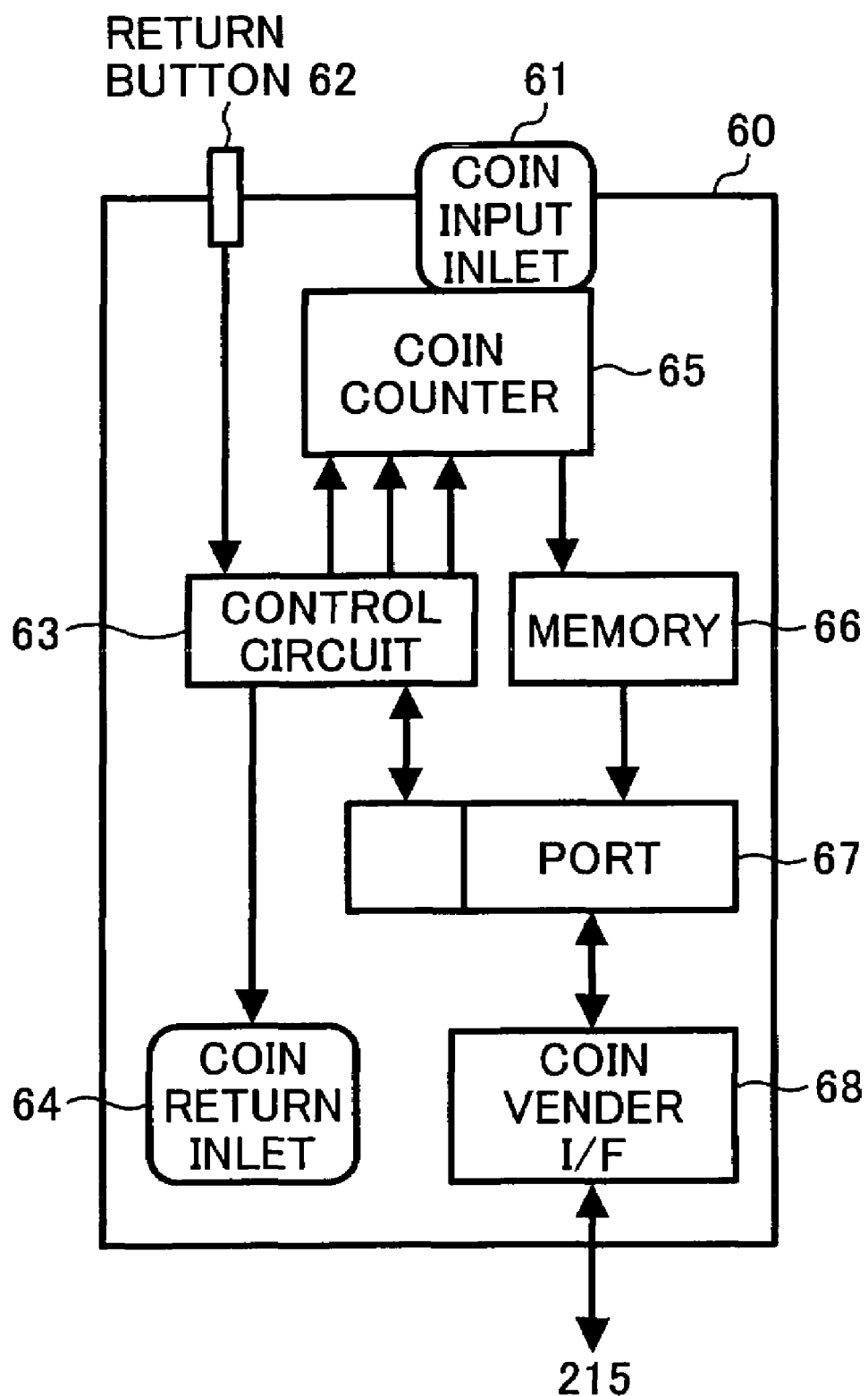
FIG. 7 is a schematic block diagram illustrating the structure of the charging device shown in FIG. 6.

As shown in FIG. 7, the coin vendor 60 includes a coin input inlet 61, a return button 62, a control circuit 63, a coin return inlet 64, a coin counter 65, a memory 66, a port 67, and a coin vendor I/F 68. The coin input inlet 61 inputs a coin received from a user. The control circuit 63 controls the entire operation of the coin vendor 60. The coin return inlet 64 outputs a coin, for example, when the return button 62 is pressed by the user. The coin counter 65 counts the number of coins input through the coin input inlet 61 to generate a counted result. The memory 66 stores the counted result. The port 67 allows the coin vendor 60 to communicate with the MFP 500 via the coin vendor I/F 68. In addition to the coin vendor 60 described referring to FIG. 7, any kind of charging device may be connected to the MFP 500.

Figure 8A:
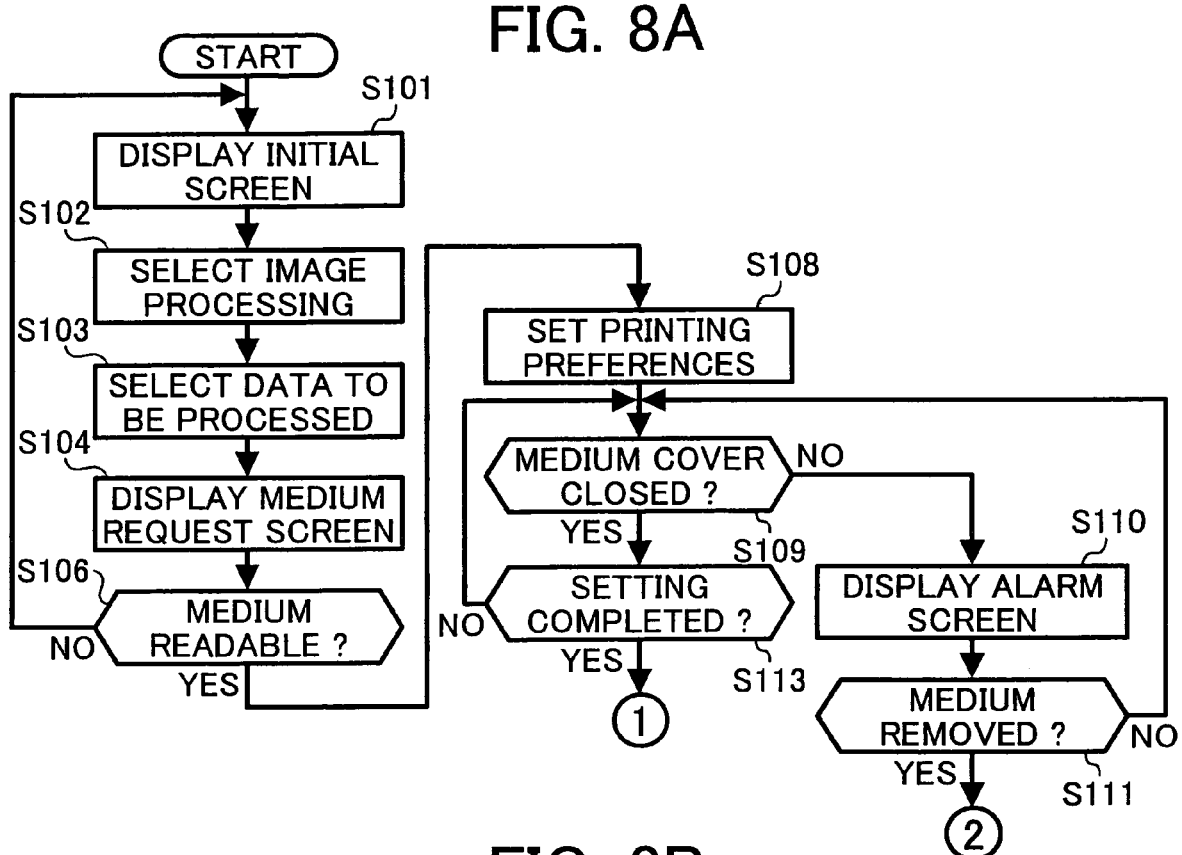
FIGS. 8A to 8C are flowcharts illustrating control of a reading operation of the MFP of FIG. 6, according to an exemplary embodiment of the present invention.
Figure 8B:
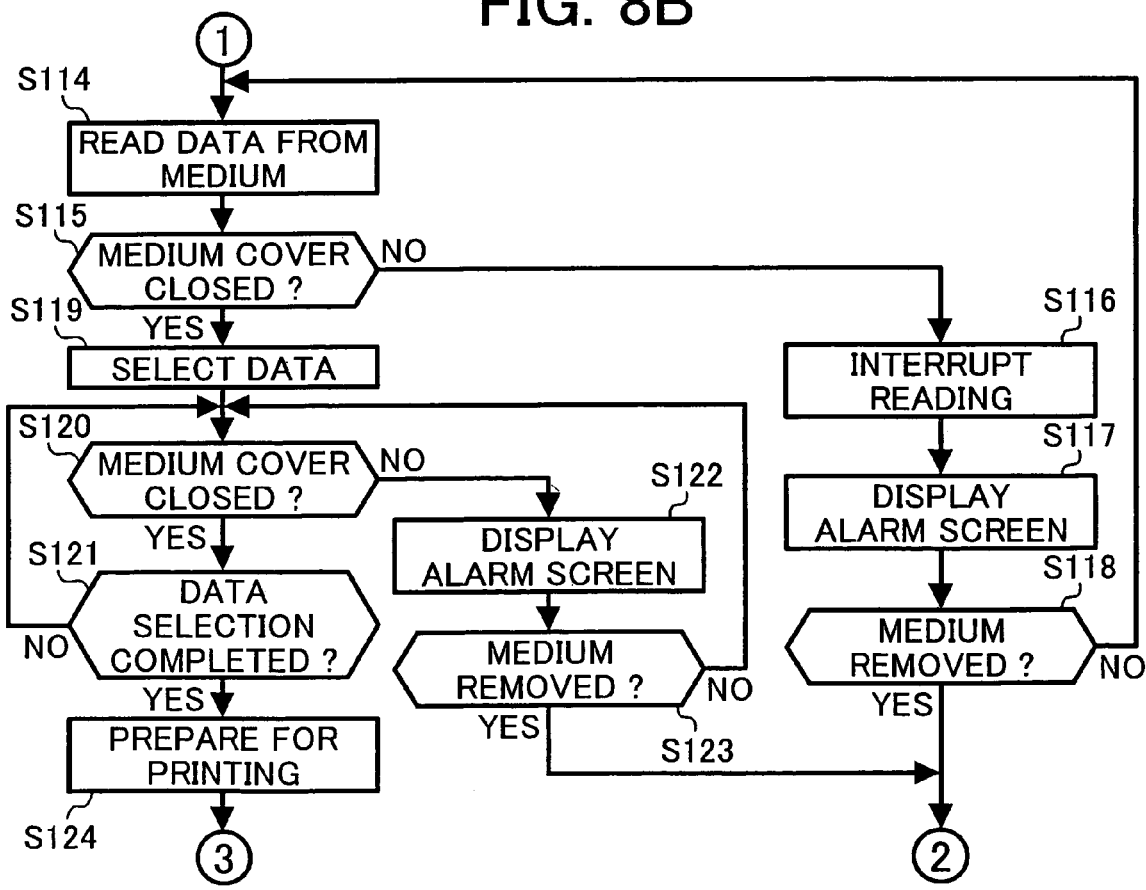
Figure 8C:
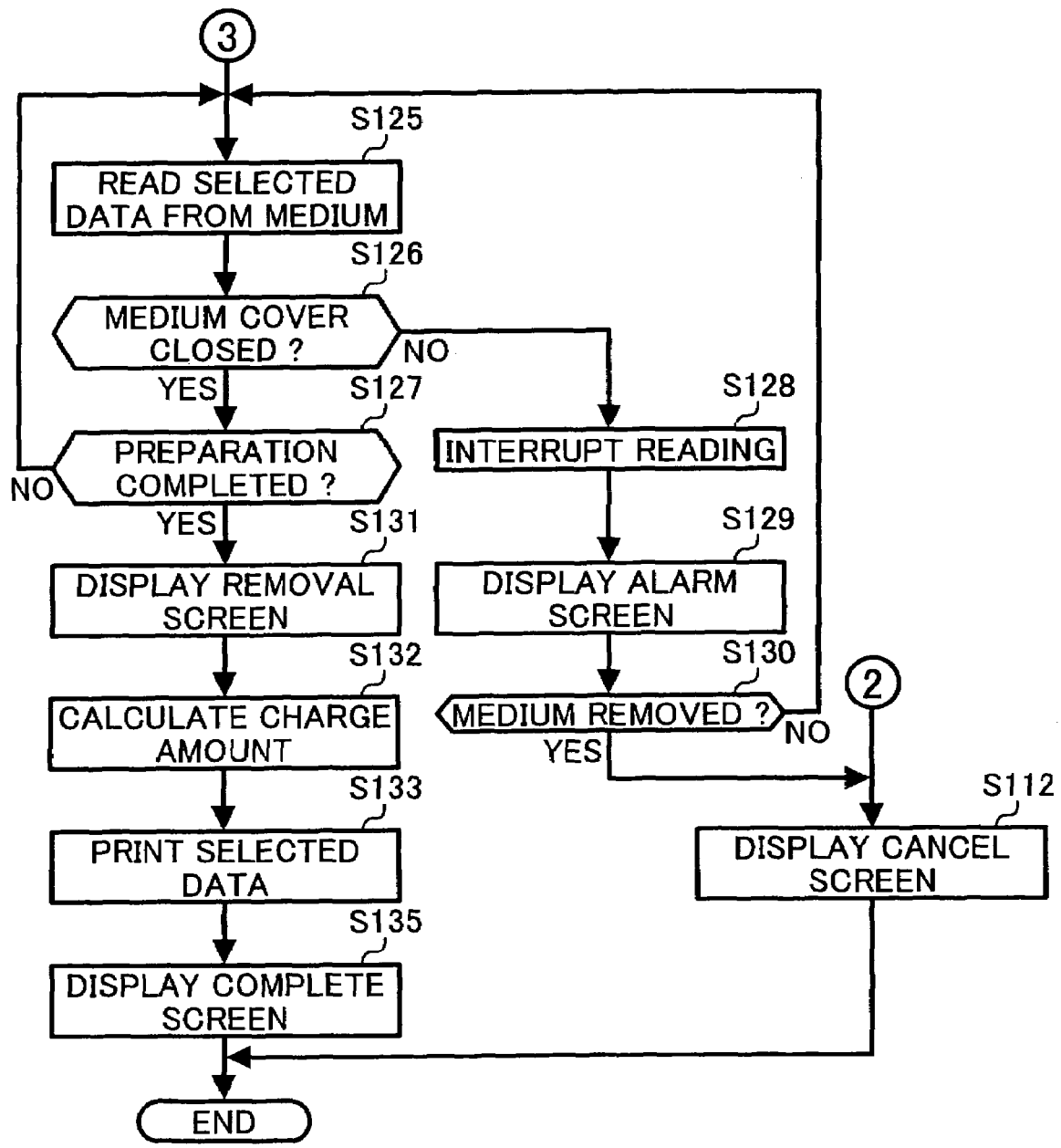

Referring now to FIGS. 8A to 8C, control of a reading operation of the MFP 500 according to opening or closing of the medium cover 230 is explained according to an exemplary embodiment of the present invention. The steps illustrated in FIGS. 8A to 8C are performed by the CPU 201 according to an instruction from a user.

Figure 9:
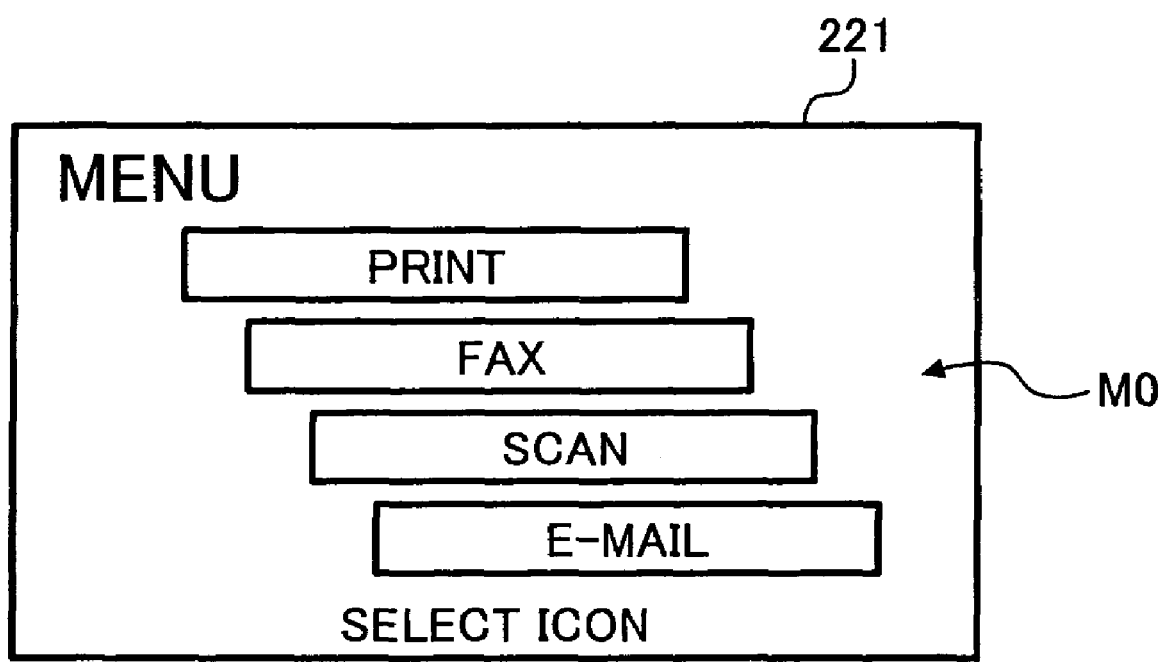
FIG. 9 is an illustration of a screen displayed by the MFP shown in FIG. 6.

Referring to FIG. 8A, Step S101 displays an initial screen on the display 221, which requests the user to select image processing to be performed by the MFP 500, such as a top menu M0 shown in FIG. 9.

Step S102 selects image processing to be performed. In this example, the user selects the "print" button of the top menu M0 to perform printing.

Step S103 selects data to be processed. In this example, the user instructs the MFP 500 to print data stored in a portable medium.

Figure 10:
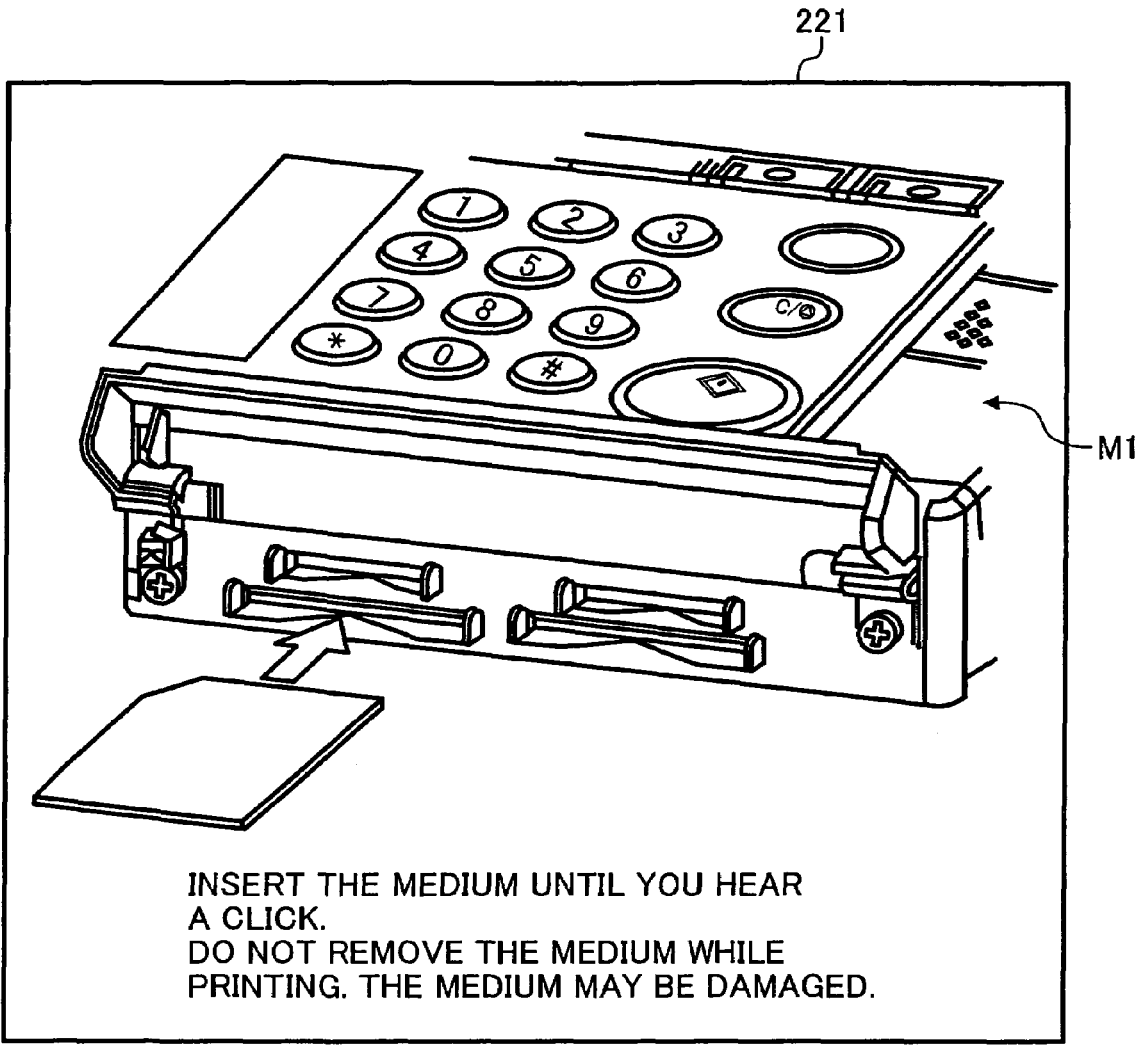
FIG. 10 is an illustration of a screen displayed by the MFP shown in FIG. 6.

Step S104 displays a medium request screen, which requests the user to insert the portable medium, such as a medium request menu M1 shown in FIG. 10, for example. The medium request menu M1 includes a picture and a message. The picture of the medium request menu M1 may be a still image or a moving image. Further, in this step, the buzzer 223 may output a beep sound to alarm the user. Furthermore, the speaker 222 may output a voice message requesting for the portable medium. At this time, the user opens the medium cover 230, and inserts the portable medium into the medium I/F 225. After the portable medium has been inserted, the medium cover 230 is closed automatically or manually.

Step S106 determines whether the portable medium is readable by the MFP 500. If the portable medium is readable ("YES" in Step S106), the operation proceeds to Step S108. If the portable medium is not readable ("NO" in Step S106), the operation returns to Step S101 to repeat Steps S101 to S106. In this step, a time period for determining whether the portable medium is readable may be previously set. When the previously-set time period has passed, the operation may automatically return to Step S101.

Alternatively, when the portable medium is not readable ("NO" in Step S106), the CPU 201 may display an error message on the display 221 indicating that the portable medium is not readable, and end the operation.

Once the portable medium is recognized, Step S108 starts an operation of setting printing preferences, such as a printing type, printing form type, document type, printing sheet size, etc. For example, the user may input the printing preferences using the input device 224. The printing preferences are then sent to the input controller 208 through the control panel I/F 211 as described referring to FIG. 2.

While the printing preferences are being set, Step S109 determines whether the medium cover 230 is closed. As described referring to FIG. 2, the cover state detector 226 detects whether the medium cover 230 is closed, and sends the detection result to the I/O port controller 210 through the control panel I/F 211. Based on the detection result, whether to continue or interrupt the setting operation is determined. If the medium cover 230 is closed ("YES" in Step S109), the operation proceeds to Step S113. If the medium cover 230 is open ("NO" in Step S109), the operation proceeds to Step S110.

Figure 11:
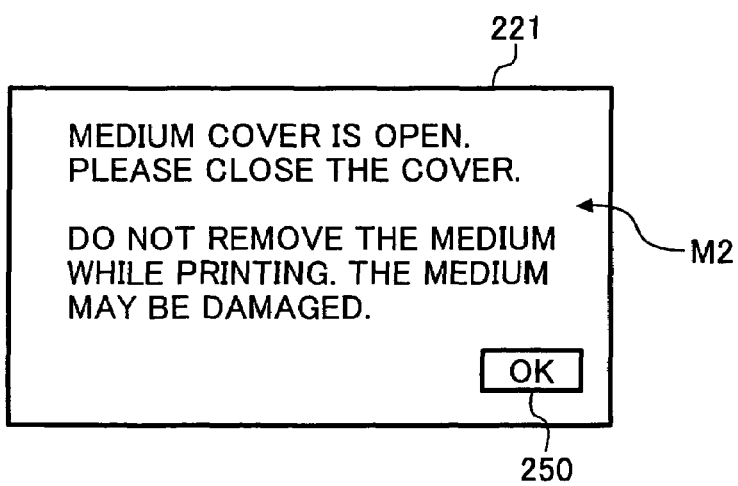
FIG. 11 is an illustration of a screen displayed by the MFP shown in FIG. 6.

Step S10 displays an alarm screen on the display 221, which requests the user to close the medium cover 230, such as an alarm menu M2 shown in FIG. 11, for example. The alarm menu M2 includes the message and the OK button 250. Further, in this step, the buzzer 233 may output a beep sound to alarm the user. Furthermore, the speaker 222 may output a voice message requesting the user to close the medium cover 230.

If the alarm menu M2 is displayed, Step S110 may further wait until the user selects the "OK" button 250 of the alarm menu M2. Once the "OK" button 250 is selected such as by using the input device 224, the operation proceeds to Step S111. Alternatively, a time period for displaying the alarm menu M2 in Step S110 may be previously set. If the previously-set time period has passed, the operation automatically proceeds to Step S111 regardless of whether the "OK" button 250 is selected.

Figure 12:
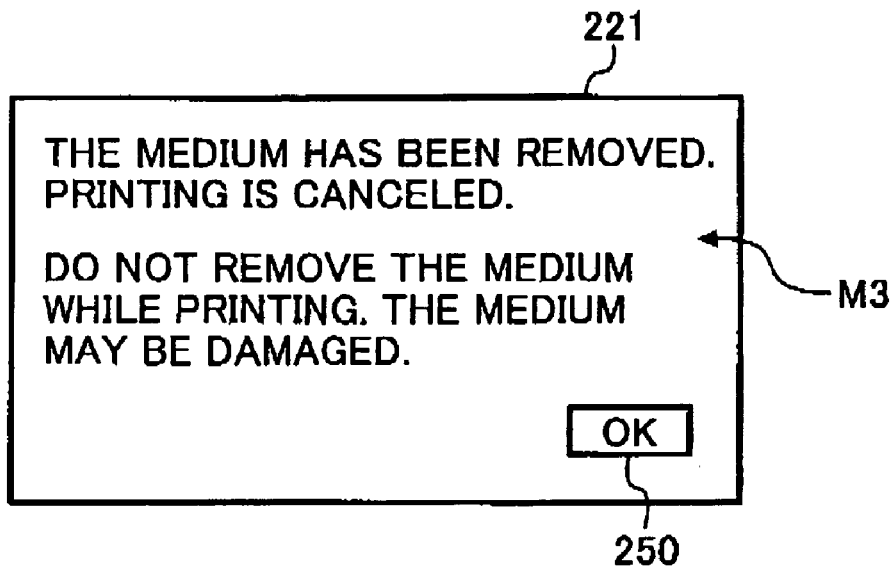
FIG. 12 is an illustration of a screen displayed by the MFP shown in FIG. 6.

Step S111 determines whether the portable medium is removed out from the medium I/F 225. If the portable medium stays in the medium I/F 225 ("NO" in Step S111), the operation returns to Step S109. If the portable medium is removed from the medium I/F 225 ("YES" in Step S111), the operation proceeds to Step S112 (FIG. 8C) to display a cancel screen, which requests the user to cancel the printing job, such as a cancel menu M3 shown in FIG. 12, for example. The cancel menu M3 includes the message and the OK button 250. Further, in this step, the buzzer 233 may output a beep sound to alarm the user. Furthermore, the speaker 222 may output a voice message requesting the user to cancel the printing job.

If the cancel menu M3 is displayed, Step S112 may further wait until the user selects the "OK" button 250 of the cancel menu M3. Once the "OK" button 250 is selected such as by using the input device 224, the operation ends without performing the printing job. Alternatively, a time period for displaying the cancel menu M3 in Step S112 may be previously set. If the previously-set time period has passed, the operation automatically ends regardless of whether the "OK" button 250 is selected. Alternatively, the operation may return to Step S101 to start over the entire process.

In Step S109 of FIG. 8A, if the medium cover 230 is closed ("YES" in Step S1109), the operation proceeds to Step S113 to determine whether the setting operation started in Step S108 has been completed. If the setting operation is completed ("YES" in Step S113), the operation proceeds to Step S114 (FIG. 8B) to start an operation of reading data from the portable medium. If the setting operation is not completed ("NO" in Step S113), the operation returns to Step S109 to continue the setting operation.

Referring to FIG. 8B, while the data is being read in Step S114, Step S115 determines whether the medium cover 230 is closed in a substantially similar manner as described referring to Step S109. If the medium cover 230 is closed ("YES" in Step S115), the operation proceeds to Step S119. If the medium cover 230 is open ("NO" in Step S115), the operation proceeds to Step S116.

Step S116 interrupts the reading operation started in Step S114.

Step S117 displays an alarm screen on the display 221, which requests the user to close the medium cover 230, such as the alarm menu M2 shown in FIG. 11, for example. Further, in this step, a sound, such as a beep sound or a voice message, may be output. If the alarm menu M2 is displayed, Step S117 may further wait until the user selects the "OK" button 250 of the menu M2. Once the "OK" button 250 is selected such as by using the input device 224, the operation proceeds to Step S118. Alternatively, a time period for displaying the alarm menu M2 in Step S117 may be previously set. If the previously-set time period has passed, the operation automatically proceeds to Step S118 regardless of whether the "OK" button 250 is selected.

Step S118 determines whether the portable medium is removed out from the medium I/F 225. If the portable medium stays in the medium I/F 225 ("NO" in Step S118), the operation returns to Step S114 to resume the reading operation. If the portable medium is removed from the medium I/F 225 ("YES" in Step S118), the operation proceeds to Step S112 (FIG. 8C) to display a cancel screen, such as the cancel menu M3 of FIG. 12. After the cancel screen is displayed, the operation may end or may return to Step S101.

In Step S115 of FIG. 8B, when the medium cover is closed ("YES" in Step S115), the operation proceeds to Step S119 to complete the reading operation. Step S119 further selects data from the data read out from the portable medium in Step S114. For example, the CPU 201 may generate a thumbnail image for each of data files stored in the portable medium, and display the thumbnail images on the display 221. The CPU 201 then allows the user to select one of the thumbnail images using the input device 224.

While the selection is being made, Step S120 determines whether the medium cover 230 is closed. If the medium cover 230 is closed ("YES" in Step S120), the operation proceeds to Step S121. If the medium cover 230 is open ("NO" in Step S120), the operation proceeds to Step S122.

Step S122 displays an alarm screen on the display 221, which requests the user to close the medium cover 230, such as the alarm menu M2 of FIG. 11. Further, in this step, a sound, such as a beep sound or a voice message, may be output. If the alarm menu M2 is displayed, Step S122 may further wait until the user selects the "OK" button 250 of the alarm menu M2. Once the "OK" button 250 is selected such as by using the input device 224, the operation proceeds to Step S123. Alternatively, a time period for displaying the alarm menu M2 in Step S122 may be previously set. If the previously-set time period has passed, the operation automatically proceeds to Step S123 regardless of whether the "OK" button 250 is selected.

Step S123 determines whether the portable medium is removed out from the medium I/F 225. If the portable medium stays in the medium I/F 225 ("NO" in Step S123), the operation returns to Step S120. If the portable medium is removed from the medium I/F 225 ("YES" in Step S123), the operation proceeds to Step S112 to display a cancel screen, such as the cancel menu M3 of FIG. 12. After the cancel screen is displayed, the operation may end or may return to Step S101.

In Step S120, if the medium cover 230 is closed ("YES" in Step S120), it is determined whether the data selection started in Step S119 has been completed in Step S121. If the selection is completed ("YES" in Step S121), the operation proceeds to Step S124 to start printing preparation. If the selection is not completed ("NO" in Step S121), the operation returns to Step S120 to continue the selecting operation. The printing preparation includes Step S1125 (FIG. 8C) of reading the data selected in Step S119 from the portable medium. In addition, the printing preparation includes the step of converting the selected data according to the printing preferences input in Step S108.

Referring to FIG. 8C, while the printing preparation is being made in Steps S124 (FIG. 8B) and S125, Step S126 determines whether the medium cover 230 is closed in a substantially similar manner as described referring to Step S109. If the medium cover 230 is closed ("YES" in Step S126), the operation proceeds to Step S127. If the medium cover 230 is open ("NO" in Step S126), the operation proceeds to Step S128.

Step S128 interrupts the reading operation performed in Step S125.

Step S129 displays an alarm screen on the display 221, such as the alarm menu M2 of FIG. 11. Further, in this step, a sound, such as a beep sound or a voice message, may be output. If the alarm menu M2 is displayed, Step S129 may further wait until the user selects the "OK" button 250 of the alarm menu M2. Once the "OK" button 250 is selected such as by using the input device 224, the operation proceeds to Step S130. Alternatively, a time period for displaying the alarm menu M2 in Step S129 may be previously set. If the previously-set time period has passed, the operation automatically proceeds to Step S130 regardless of whether the "OK" button 250 is selected.

Step S130 determines whether the portable medium is removed out from the medium I/F 225. If the portable medium stays in the medium I/F 225 ("NO" in Step S130), the operation returns to Step S125. If the portable medium is removed from the medium I/F 225 ("YES" in Step S130), the operation proceeds to Step S112 to display a cancel screen, such as the cancel menu M3 of FIG. 12. After the cancel screen is displayed, the operation may end or it may return to Step S101.

In Step S126, if the medium cover 230 is closed ("YES" in Step S126), Step S127 determines whether the printing preparation started in Step S124 has been completed. If the printing preparation has been completed ("YES" in Step S127), the operation proceeds to Step S131. If the printing preparation has not been completed ("NO" in Step S127), the operation continues the printing preparation started in Step S124, such as Step S125 of reading the selected data.

Once the printing preparation has been completed, Step S131 displays a removal request screen, which requests the user to remove the portable medium from the medium I/F 255. At this time, the user opens the medium cover 230, and removes the portable medium from the medium I/F 255. Further, in this step, a sound, such as a beep sound or a voice message, may be output. This may prevent the user from accidentally leaving the portable medium in the medium I/F 255.

Step S132 calculates a charged amount, and displays a charge screen on the display 221, which requests the user to pay the charged amount. At this time, the user pays the charged amount using the coin vendor 60. However, the user may pay the charged amount using a card, for example, such as a pre-paid card.

Step S133 prints the selected data according to the printing preferences. For example, the data prepared for printing is sent to the image processing unit 100 via the hub 2 (FIG. 2). Once the prepared data has been recognized by the CPU 121, the CPU 121 instructs the printer controller 102 to print the prepared data using the printer 103.

Figure 13:
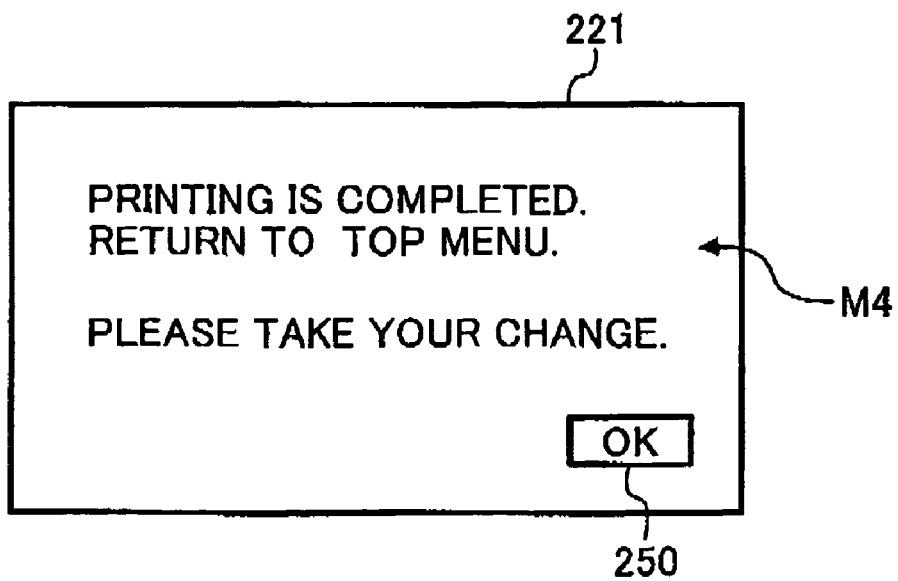
FIG. 13 is an illustration of a screen displayed by the MFP shown in FIG. 6.

Step S135 displays a complete screen on the display 221, which notifies the user that the printing job has been completed, such as a complete menu M4 shown in FIG. 13, for example. The complete menu M4 includes the message and the "OK" button 250. Further, in this step, a sound, such as a beep sound or a voice message, may be output. Once the "OK" button 250 is selected such as by using the input device 224, the operation ends. Alternatively, a time period for displaying the complete menu M4 in Step S135 may be previously set. If the previously-set time period has passed, the operation automatically ends regardless of whether the "OK" button 250 is selected. Once the operation is completed, the CPU 201 may cause the display 221 to display an initial screen, such as the top menu M0 of FIG. 9.

In this manner as described referring to FIGS. 8A to 8C, even when the portable medium is accidentally removed while performing a reading operation, the portable medium can be protected from being damaged. Further, the reading operation may be carried out more smoothly without stalling, or it may be completed more successfully without failure.

Figure 14A:
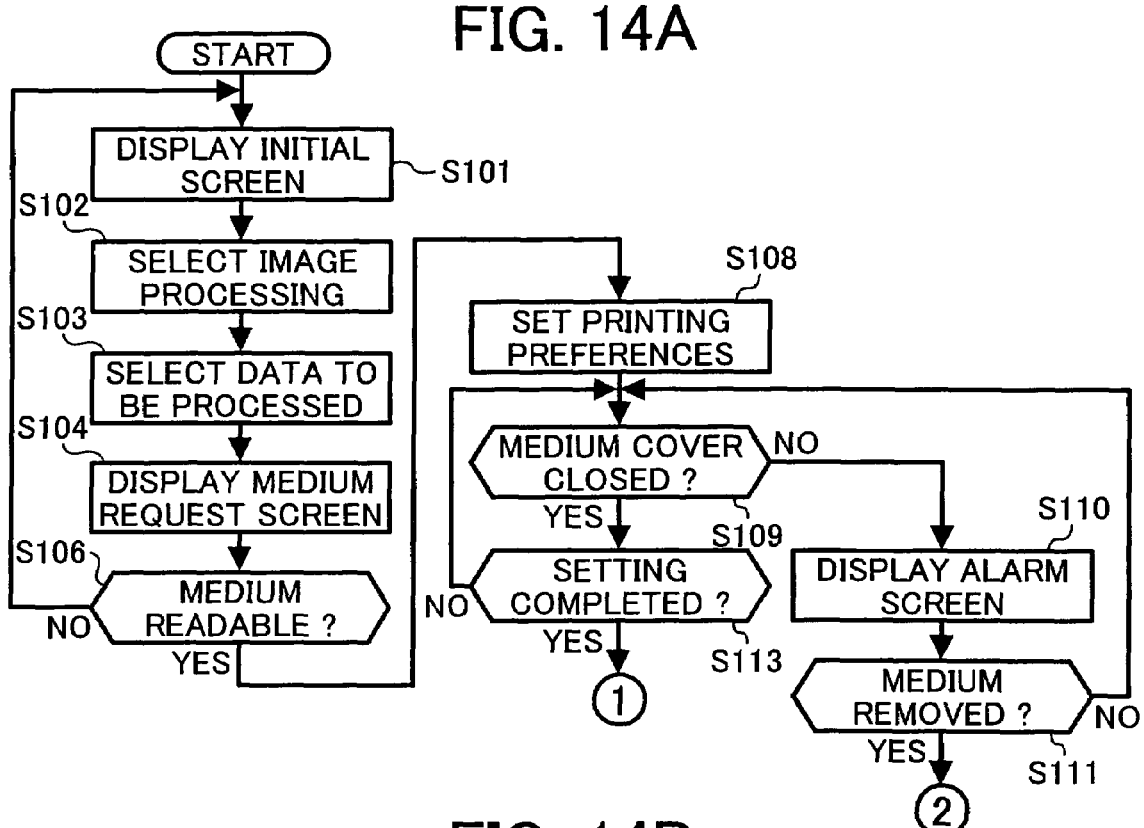
FIGS. 14A to 14D are flowcharts illustrating control of a reading operation of the MFP shown in FIG. 6, according to an exemplary embodiment of the present invention.
Figure 14B:
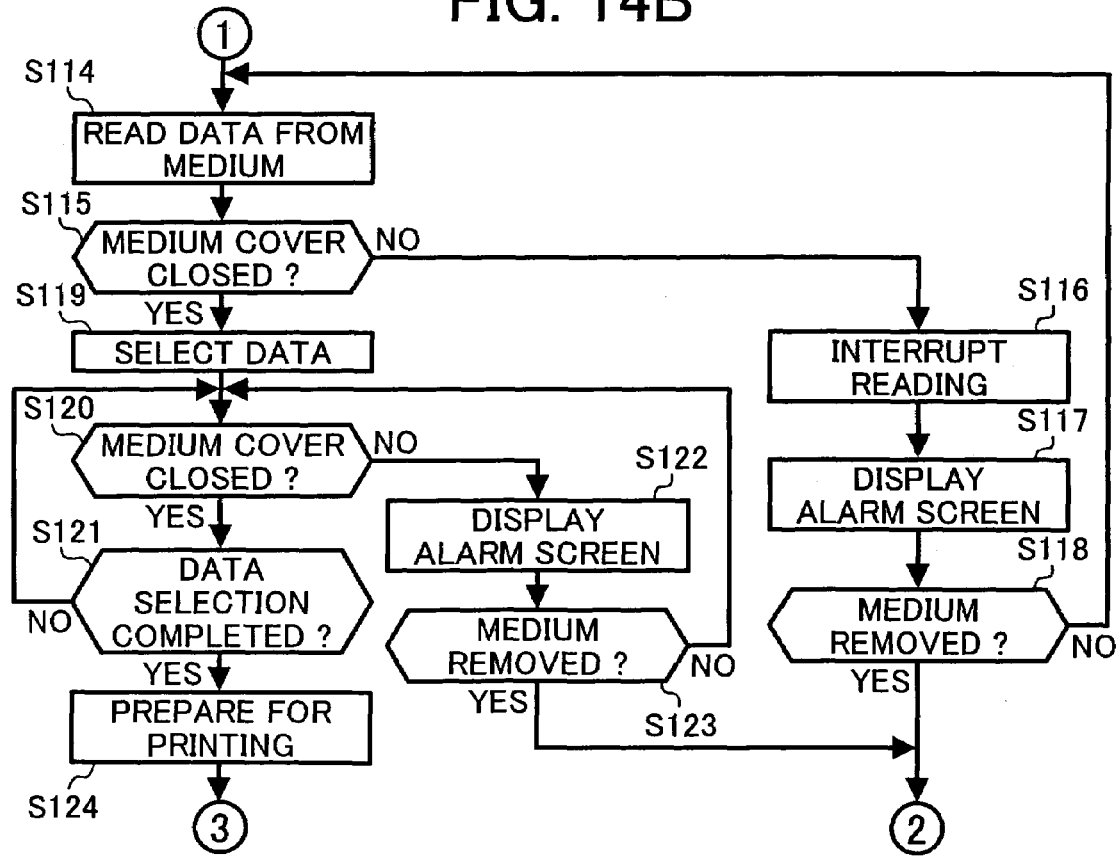
Figure 14C:
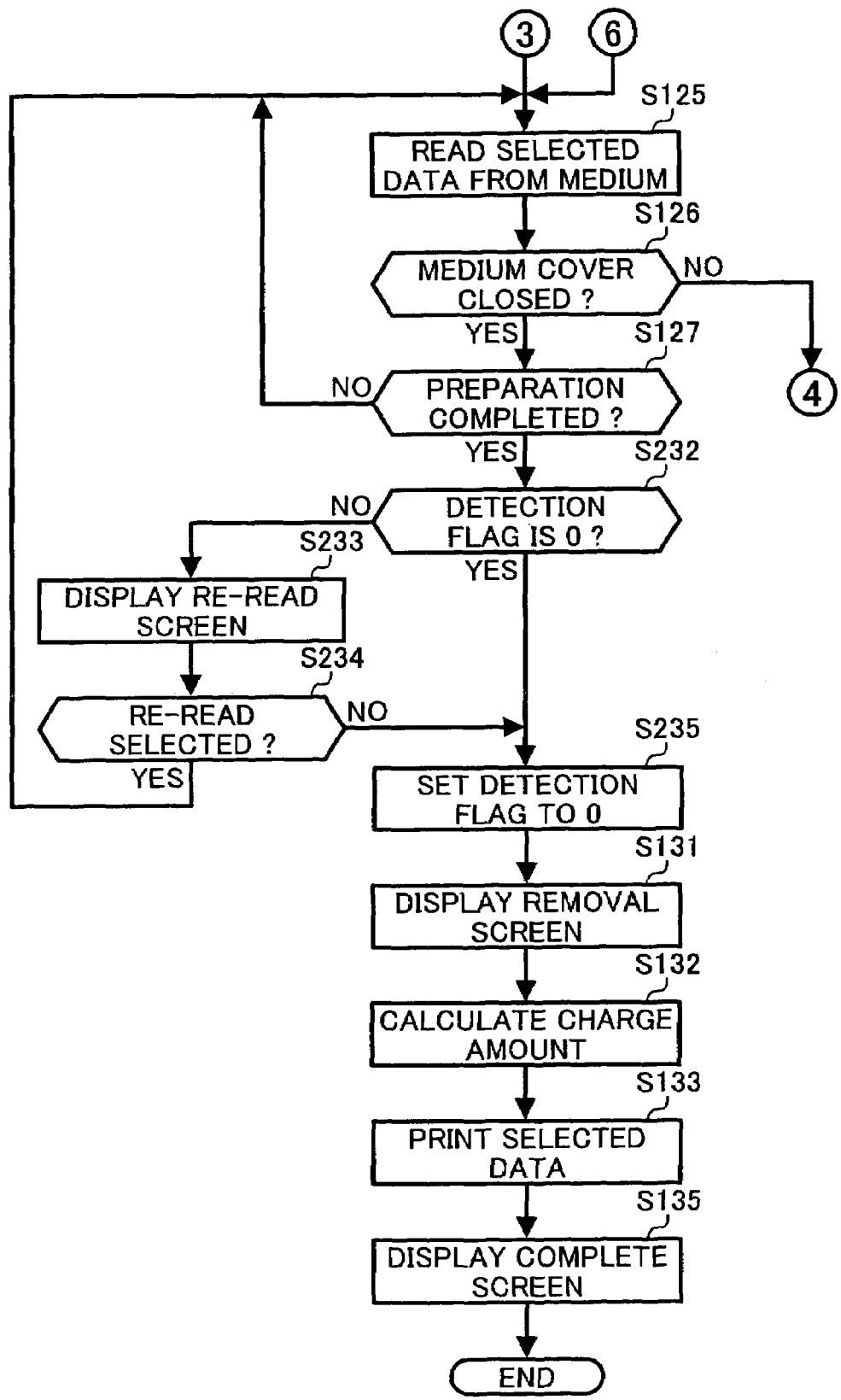
Figure 14D:
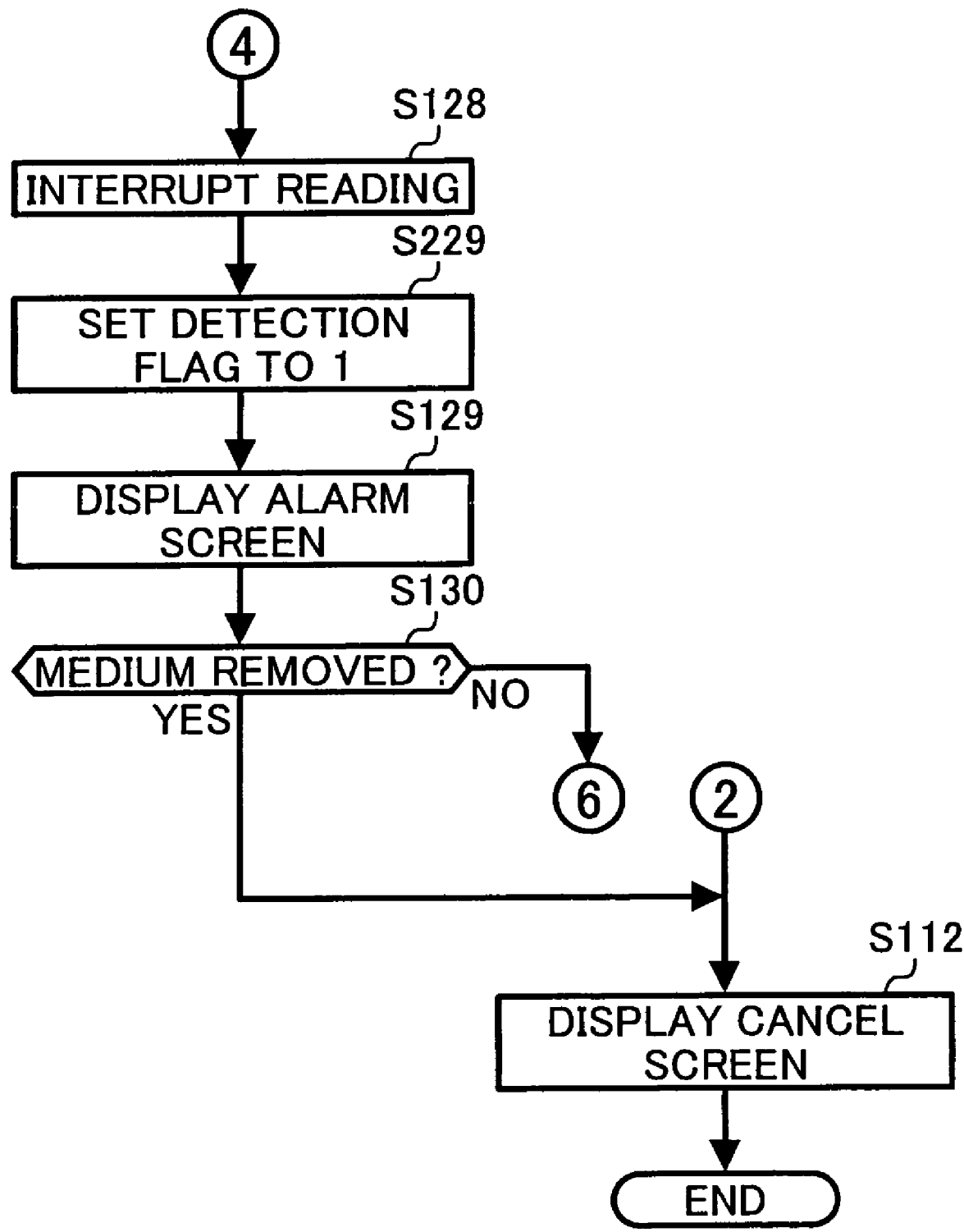

Referring now to FIGS. 14A to 14D, controlling a reading operation of the MFP 500 according to opening or closing of the medium cover 230 is explained according to an exemplary embodiment of the present invention. The operation illustrated in FIGS. 14A to 14D is substantially similar to the operation illustrated in FIGS. 8A to 8C. The differences include the addition of Steps S232 (FIG. 14C), S233 (FIG. 14C), S234 (FIG. 14C), S235 (FIG. 14C), and S229 (FIG. 14D).

Referring to FIG. 14C, while the printing preparation is performed, including Step S125 of reading the selected data, Step S126 determines whether the medium cover 230 is closed. If the medium cover 230 is open ("NO" in Step S126), the operation proceeds to Step S128 (FIG. 14D) to interrupt the reading operation performed in Step S125.

Referring to FIG. 14D, Step S229 sets a detection flag to 1, indicating that the medium cover 230 is open.

Step S129 displays an alarm screen on the display 221, such as the alarm menu M2 of FIG. 11, for example. Further, in this step, a sound, such as a beep sound or a voice message, may be output. If the alarm menu M2 is displayed, Step S129 may further wait until the user selects the "OK" button 250 of the alarm menu M2. Once the "OK" button 250 is selected such as by using the input device 224, the operation proceeds to Step S130. Alternatively, a time period for displaying the alarm menu M2 in Step S129 may be previously set. If the previously-set time period has passed, the operation automatically proceeds to Step S130 regardless of whether the "OK" button 250 is selected.

Referring back to FIG. 14C, if Step S126 determines that the medium cover 230 is closed ("YES" in Step S126), the operation proceeds to Step S127 to determine whether the printing preparation performed in Steps S124 and S125 has been completed. If the printing preparation has been completed ("YES" in Step S1127), the operation proceeds to Step S232. Otherwise ("NO" in Step S127), the operation returns to Step S125 to continue the printing preparation, i.e., the reading operation.

Step S232 determines whether the detection flag is set to 0. If the detection flag is set to 0 ("YES" in Step S232) indicating that the medium cover 230 has been kept closed while performing the printing preparation, the operation proceeds to Step S235. If the detection flag is set to 1 ("NO" in Step S232) indicating that the medium cover 230 was opened even once while performing the printing preparation, the operation proceeds to Step S233.

Step S235 resets the detection flag to 0, and the operation proceeds to Step S131 to display a removal request screen. However, once it is determined that the detection flag is set to 0 in Step S232, the operation may proceed to Step S131 without performing Step S235 of setting the detection flag to 0.

Figure 15:
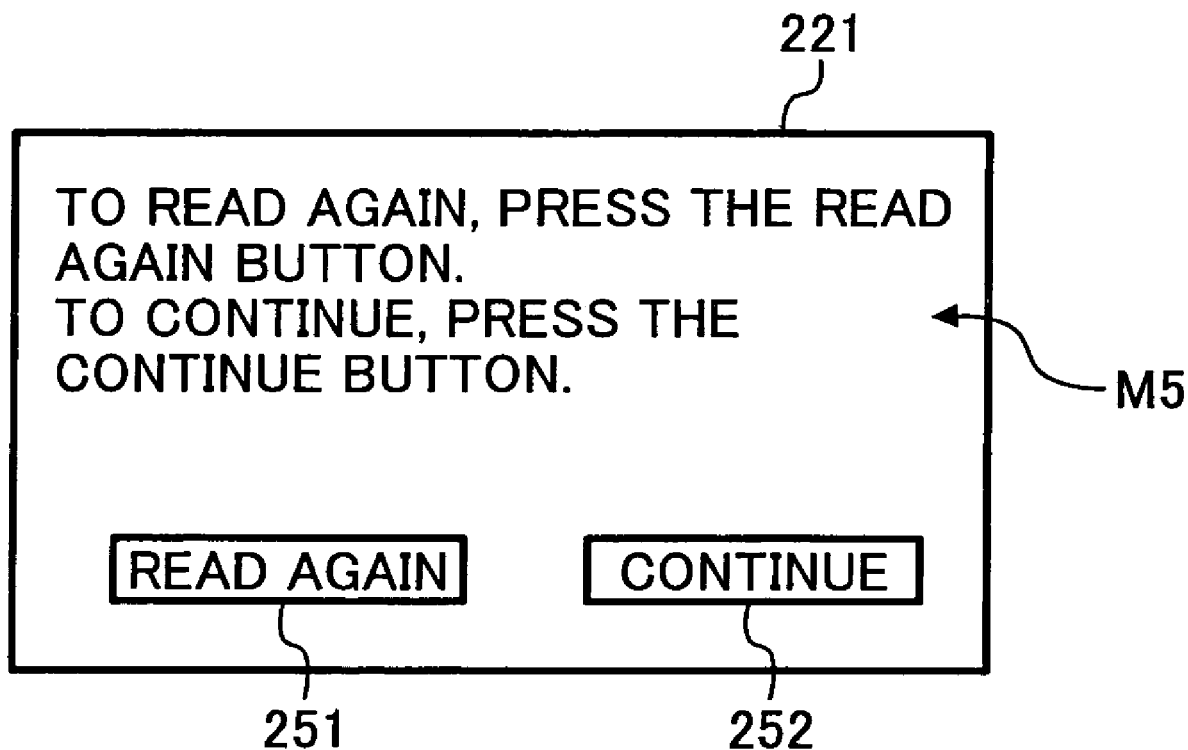
FIG. 15 is an illustration of a screen displayed by the MFP shown in FIG. 6.

Step S233 displays a re-read screen on the display 221, which gives the user an option of re-reading the data from the portable medium, such as a re-read menu M5 shown in FIG. 15. The re-read menu M5 requests the user to select either the "Read again" button 251 or the "Continue" button 252. Further, in this step, a sound, such as a beep sound or a voice message, may be output.

Step S234 determines whether the "Read again" button is selected from the re-read menu M5. If the "Read again" button is selected ("YES" in Step S234), the operation returns to Step S125 to start again the reading operation. If the "Continue" button is selected ("NO" in Step S234), the operation proceeds to Step S235 without performing the reading operation again.

The operation of FIG. 14 may be performed in different ways. For example, when the detection flag is set to 0 ("YES" in Step S232), the operation may proceed to Step S131 without performing the Step S235.

In this manner as described referring to FIGS. 14A to 14D, even when the portable medium is accidentally removed while performing a reading operation, the portable medium can be protected from being damaged. Further, the reading operation may be carried out more smoothly without stalling, or it may be completed more successfully without failure. Furthermore, the user may easily request the MFP 500 to perform the reading operation again in case the portable medium is removed.

Numerous additional modifications and variations are possible in light of the above teachings. It is therefore to be understood that within the scope of the appended claims, the disclosure of this patent specification may be practiced in ways other than those specifically described herein.

For example, elements and/or features of different illustrative embodiments may be combined with each other and/or substituted for each other within the scope of this disclosure and appended claims.

Further, any one of the above-described and other methods or functions of the present invention may be performed by an image processing apparatus other than the MFP 500.

Furthermore, as described above, any one of the above-described and other methods of the present invention may be embodied in the form of a computer program stored in any kind of storage medium. Examples of storage mediums include, but are not limited to, a flexible disk, a hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

This patent application is based on and claims priority to Japanese patent application No. 2004-320098 filed on Nov. 4, 2004, in the Japanese Patent Office, the entire contents of which are hereby incorporated herein by reference.

The invention claimed is:

1. An image processing apparatus having an operation panel, comprising:
   a medium interface formed on a first surface of the operation panel and configured to insert therein a portable medium storing data;
   a medium cover having a panel section fixed to the first surface of the operation panel and a cover section movably attached to the panel section, the cover section being configured to close for covering the medium interface and to open for exposing the medium interface;
   a detector provided on the first surface of the operation panel and configured to generate a detection result indicating an open or close state of the medium cover;
   a processor coupled to the operation panel configured to control a reading operation for reading the data from the portable medium based on the detection result and to generate a notification when the detection result indicates that the medium cover is in the open state;
   a notifying device configured to output the notification generated by the processor to a user when the detection result indicates that the medium cover is in the open state; and
   an input device provided on a second surface of the operation panel and configured to input an instruction from the user,
   wherein when the detection result indicates that the medium cover is in the open state, the processor is further configured to interrupt the reading operation until the instruction from the user is input.

2. The apparatus of claim 1, wherein the detection result comprises:
   a first state indicating that the medium cover was kept closed during all of the reading operation; and
   a second state indicating that the medium cover was opened at least once during the reading operation.

3. The apparatus of claim 1, wherein the notifying device comprises:
   a display provided on the second surface of the operation panel and configured to display a screen selected by the processor based on the detection result.

4. The apparatus of claim 3, wherein the notifying device further comprises:

an audio device configured to output a sound selected by the processor based on the detection result.

5. The apparatus of claim 1, further comprising:
   an image forming device coupled to the processor and configured to form an image on a recording medium according to the data read from the portable medium under control of the processor.

6. An image processing apparatus, comprising:
   a medium interface to which a portable medium storing data is inserted;
   a medium cover configured to be closed to cover the medium interface and to be opened to expose the medium interface;
   a detector configured to detect opening or closing of the medium cover to generate a detection result, the detection result indicating an open or close state of the medium cover;
   a controller configured to control a reading operation for reading the data from the portable medium based on the detection result and to generate a notification when the detection result indicates that the medium cover is in the open state;
   a notifying device configured to output the notification generated by the controller to a user when the detection result indicates that the medium cover is in the open state; and
   an input device configured to input an instruction from the user,
   wherein when the detection result indicates that the medium cover is in the open state, the controller is further configured to interrupt the reading operation until the instruction from the user is input.

7. The apparatus of claim 6, wherein the controller is further configured to:
   interrupt the reading operation when the detection result indicates that the medium cover is opened; and
   request the user to close the medium cover through the notifying device when the detection result indicates that the medium cover is opened.

8. The apparatus of claim 7, wherein the controller is further configured to:
   determine whether the portable medium is removed from the medium interface based on the detection result; and
   cancel the reading operation when it is determined that the portable medium is removed.

9. The apparatus of claim 8, wherein the controller is further configured to:
   request the user to cancel the reading operation through the notifying device when it is determined that the portable medium is removed,
   wherein the reading operation is canceled when the instruction to cancel the reading operation is input from the user through the input device.

10. The apparatus of claim 8, wherein the controller is further configured to:
    request the user whether to repeat the reading operation through the notifying device when it is determined that the portable medium is inserted; and
    repeat the reading operation when the instruction to repeat the reading operation is input from the user through the input device.

11. The apparatus of claim 6, wherein the controller is further configured to:
    determine whether the reading operation is completed when the detection result indicates that the medium cover is closed to generate a complete result; and request the user to remove the portable medium from the medium interface through the notifying device when the complete result indicates that the reading operation is completed.

12. The apparatus of claim 11, wherein the controller is further configured to:
  determine whether the portable medium is removed after requesting the user to remove the portable medium to generate a removal detection result; and
  repeat requesting the user to remove the portable medium from the medium interface when the removal detection result indicates that the portable medium is inserted.

13. The apparatus of claim 6, wherein the controller is further configured to:
  apply image processing to the data read from the portable medium to generate processed image data,
  the apparatus further comprising:
  an image forming device configured to form an image of the processed image data on a recording medium.

14. An image processing apparatus, comprising:
  means for inserting therein a portable medium storing data;
  means for covering the inserting means in a first state and exposing the inserting means in a second state;
  means for generating a detection result indicating whether the covering means is in the first state or the second state;
  means for controlling a reading operation for reading the data from the portable medium based on the detection result and generating a notification when the detection result indicates that the means for covering is in the second state;
  means for outputting the notification generated by the controlling means to a user when the detection result indicates that the means for covering is in the second state; and
  means for inputting an instruction from the user,
  wherein when the detection result indicates that the means for covering is in the second state the means for controlling is configured to interrupt the reading operation until the instruction from the user is input.

15. A computer readable medium storing a computer program for controlling an image processing apparatus to perform control operations comprising:
  detecting inserting of a portable medium storing data into a medium interface;
  generating a detection result indicating whether a medium cover covering the medium interface is in an open or closed state;
  controlling a reading operation for reading the data from the portable medium based on the detection result;
  notifying a user when the detection result indicates that the medium cover is in the open state; and
  receiving an instruction from a user;
  wherein when the detection result indicates that the medium cover is in the open state, the reading operation is interrupted until the instruction from the user is input.

16. The apparatus of claim 6, wherein when the detection result indicates that the medium cover is in the open state, the controller is configured to interrupt the reading operation until the detector generates a new detection result indicating that the medium cover is in the closed state, and
  wherein when the detection result indicates that the medium cover is in the open state, the detector is configured to interrupt generating a new detection result until the instruction is input and to generate a new detection result after the instruction from the user is input.

17. The apparatus of claim 13, wherein the controller is further configured to:
  control a setting operation for setting printer settings for the data to be read out from the portable medium based on the detection result; and
  control a printing preparation operation for preparing the data read out from the portable medium for printing based on the detection result,
  wherein when the detection result indicates that the medium cover is in the open state during the setting operation the controller is configured to interrupt the setting operation until the instruction from the user is input, and when the detection result indicates that the medium cover is in the open state during the printing preparation operation the controller is configured to interrupt the printing preparation operation until the instruction from the user is input.

18. The apparatus of claim 17, wherein the controller is further configured to:
  start over the operation being interrupted without repeating the operation being completed before the operation being interrupted is started when the instruction from the user indicates to start over the operation being interrupted.

19. A method for controlling a printing operation on an image processing apparatus provided with a medium interface and a medium cover, the method comprising:
  inserting a portable medium storing data to the medium interface of the image processing apparatus;
  covering the medium interface with the medium cover when the portable medium is inserted in the medium interface;
  activating a reading operation for reading the data from the portable medium;
  detecting opening or closing of the medium cover to generate a detection result, the detection result indicating an open or close state of the medium cover;
  interrupting the reading operation when the detection result indicates that the medium cover is in the open state;
  requesting a user to close the medium cover when the detection result indicates that the medium cover is in the open state; and
  receiving an instruction from the user,
  wherein when the detection result indicates that the medium cover is in the open state, the reading operation is interrupted until the instruction from the user is received.

* * * * *